United States Patent [19]

Igarashi

[11] Patent Number: 5,348,779

[45] Date of Patent: Sep. 20, 1994

[54] REFRIGERANT TRANSPORTING HOSE HAVING INNER TUBE INCLUDING RESIN LAYER, AND CONNECTOR FOR THE SAME

[75] Inventor: Ichiro Igarashi, Komaki, Japan

[73] Assignee: Tokai Rubber Industries, Ltd., Japan

[21] Appl. No.: 102,716

[22] Filed: Aug. 6, 1993

Related U.S. Application Data

[62] Division of Ser. No. 752,030, Aug. 29, 1991, Pat. No. 5,264,262.

[51] Int. Cl.$^5$ .............................................. F16L 11/08
[52] U.S. Cl. ................................ 428/36.7; 428/36.2; 428/36.8; 428/36.91; 525/66; 138/125; 138/126; 138/127; 285/55; 285/256
[58] Field of Search ................ 428/36.9, 36.2, 36.8, 428/36.91; 285/55, 256; 525/66; 138/125, 126, 137

[56] References Cited

U.S. PATENT DOCUMENTS

| | | | |
|---|---|---|---|
| 4,018,460 | 4/1977 | Morris et al. | 285/39 |
| 4,690,435 | 9/1987 | Manning et al. | 285/256 |
| 4,907,625 | 3/1990 | Ito et al. | 138/126 |
| 4,994,524 | 2/1991 | Udipi | 525/66 |

FOREIGN PATENT DOCUMENTS

| | | |
|---|---|---|
| 2505700 | 8/1975 | Fed. Rep. of Germany . |
| 3739089 | 5/1988 | Fed. Rep. of Germany . |
| 1017653 | 1/1966 | United Kingdom . |

OTHER PUBLICATIONS

World Patents Index Latest, Week 8732, Derwent Publications, Ltd., London, GB; AN 87-223656 & JP-A-62 147 188 (UBE Industries) Jul. 1, 1987.

Primary Examiner—Charles R. Nold
Attorney, Agent, or Firm—Parkhurst, Wendel & Rossi

[57] ABSTRACT

A refrigerant transporting hose having a laminar structure including an inner tube consisting of at least one layer, an outer tube disposed radially outwardly of and coaxially with the inner tube, and a reinforcing fiber layer interposed between the inner and outer tubes. The inner tube includes a resin layer formed of a resin composition which consists of a blend of modified polyolefin and polyamide resin, and 1–10% by weight of ε-caprolactam. A proportion by weight of the modified polyolefin to the polyamide resin is selected within a range between 40/60 and 10/90. The hose may have a sealing layer formed on the inner surface of the inner tube. The sealing layer consists of a chlorinated elastomer containing a dispersion of an acid receptive agent. Alternately, the sealing layer may be provided on the outer surface of a hose connector nipple.

3 Claims, 3 Drawing Sheets

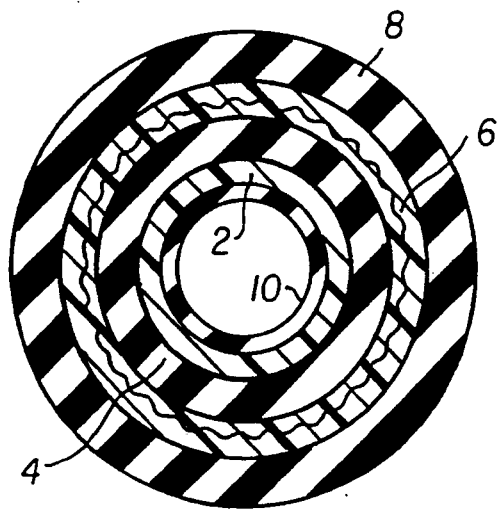
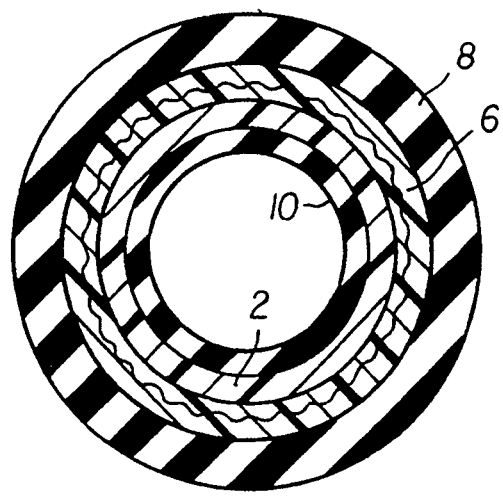
FIG. 3  FIG. 4
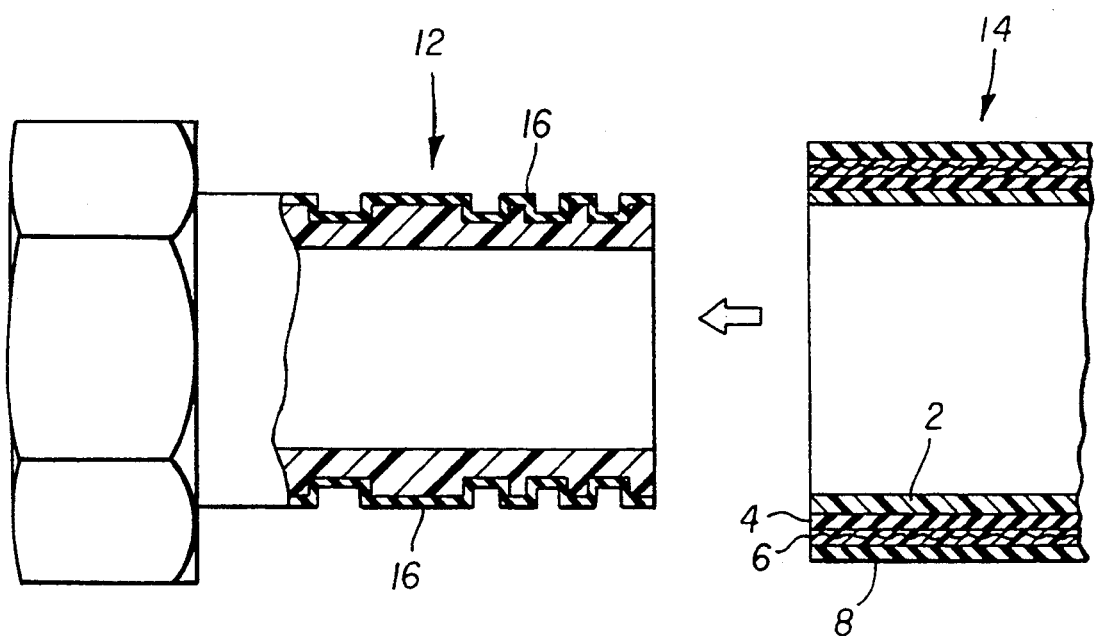
FIG. 5

REFRIGERANT TRANSPORTING HOSE HAVING INNER TUBE INCLUDING RESIN LAYER, AND CONNECTOR FOR THE SAME

This is a division of application Ser. No. 07/752,030 filed Aug. 29, 1991, now U.S. Pat. No. 5,264,262.

BACKGROUND OF THE INVENTION

1. Field of the Invention

The present invention relates in general to a refrigerant transporting hose and a connector for such a hose, and more particularly to a hose suitable for use as a refrigerant conduit for an automotive cooler or air conditioner, and a connector for connecting such a refrigerant transporting hose.

2. Discussion of the Prior Art

A hose having a three-layered integral laminar structure is known as a conduit for transporting a refrigerant such as flon gas (fluorohydrocarbon and chlorofluorohydrocarbon). This three-layered hose consists of an inner rubber layer, an outer rubber layer disposed outwardly of the inner rubber layer, and a reinforcing fiber layer interposed between the inner and outer rubber layers. The inner rubber layer is generally formed of acrylonitrile-butadiene copolymer rubber (NBR) or chlorosulphonated polyethylene rubber (CSM), while the reinforcing fiber layer has a mesh structure formed by braided organic fiber yarn such as polyester fiber, rayon fiber, or nylon fiber. The outer rubber layer is formed of an elastomer (EPDM) consisting of a copolymer of ethylene, propylene and diene, or chloroprene rubber (CR). The outer rubber layer has spiking holes formed from its surface down to the reinforcing fiber layer, so that the flon gas which has permeated through the inner rubber tube may escape outside the hose, thereby preventing the gas from remaining between the adjacent layers. The flon gas remaining between the adjacent layers may cause local expansion at the interfaces of the adjacent layers, resulting in undesired separation of the layers from each other.

This type of hose whose layers are formed solely of rubber materials except for the reinforcing fiber layer exhibits a high degree of flexibility, and is accordingly easy to handle when the hose is installed in place as a conduit. Further, the known hose indicated above has a high sealing effect or fluid-tightness with respect to a connector nipple or other hose joint. However, since a rubber material, in particular, NBR and CSM commonly used for the inner rubber layer, has some degree of gas permeability, the known hose tends to suffer from leakage of flon gas or other refrigerant, when the refrigerant has a relatively low molecular weight. Namely, the conventional hose which consists principally of such rubber materials permits the refrigerant gas to permeate through its wall and leaks out, whereby the amount of the refrigerant circulating in a refrigerating system is gradually reduced, leading to reduction in the cooling capacity of the system. To maintain the desired cooling capacity of the system for a prolonged period of time, therefore, the system should be re-charged by the refrigerant gas, at relatively short intervals. Thus, the known refrigerant transporting hose has a maintenance problem. Further, the destruction of the ozone layer of the earth atmosphere by flon has been an environmental problem these days. In this respect, there has been a need for improving the gas impermeability or resistance to gas permeation of the refrigerant transporting hose.

In an attempt to improve the refrigerant impermeability of the hose, it has been proposed to provide the inner tube of the hose with a resin layer made of a resin material which exhibits high refrigerant impermeability. For example, a hose whose inner tube includes a resin layer formed of a polyamide resin such as nylon 6, nylon 66 or a copolymer thereof is proposed. While this hose is considerably improved in the refrigerant impermeability, the hose suffers from insufficient flexibility due to excessively high hardness or rigidity of the polyamide resin. If the thickness of the polyamide resin layer is reduced so as to increase the flexibility, the refrigerant impermeability of the hose is undesirably deteriorated.

As discussed above, the known refrigerant transporting hoses have both an advantage and a disadvantage and are not practically satisfactory in quality, particularly, in view of the recent increasing need for further improvement in the refrigerant impermeability.

SUMMARY OF THE INVENTION

It is therefore a first object of the present invention to provide a refrigerant transporting hose which exhibits improved flexibility while maintaining excellent refrigerant impermeability.

A second object of the invention is to provide a connector for such a refrigerant transporting hose, which is sufficiently durable under severe condition of use.

The first object may be accomplished according to one aspect of the present invention, which provides a refrigerant transporting hose having a laminar structure including an inner tube consisting of at least one layer, an outer tube disposed radially outwardly of and coaxially with the inner tube, and a reinforcing fiber layer interposed between the inner and outer tubes, wherein the inner tube includes a resin layer formed of a resin composition which substantially consists of a blend of modified polyolefin and polyamide resin, and 1–10% by weight of $\epsilon$-caprolactam, a proportion by weight of the modified polyolefin to the polyamide resin being selected within a range between 40/60 and 10/90.

The present invention was developed as a result of an extensive study in an effort to give improve flexibility to a layer of a polyamide resin. Namely, the applicants discovered that the resin layer as a layer of the inner tube of the hose enables the hose to be improved in both the gas impermeability and the flexibility, if the resin layer is made of a three-component resin composition which consists principally of a blend of modified polyolefin and polyamide resin of a suitable proportion as specified above, and 1–10% by weight of $\epsilon$-caprolactam. The modified polyolefin may be a graft polymer obtained by graft polymerization of polyolefin (whose major component or components consists or consist of ethylene and/or propylene), by unsaturated carboxylic acid or a derivative thereof. The polyamide resin is generally selected from among nylon 6, nylon 66, nylon 12 and a copolymer thereof.

The refrigerant transporting hose of the present invention whose inner tube includes a resin layer formed of the above-described three-component resin composition exhibits a sufficiently high degree of flexibility as well as excellent resistance to refrigerant permeation.

The inner tube may further include an inner rubber layer which is radially outwardly adjacent to the resin layer. This inner rubber layer is preferably formed of a non-polar rubber material such as ethylene-propylene rubber, butyl rubber or halogenated butyl rubber, for better adhesion between the resin layer and the inner rubber layer. In this case, the resin layer and the inner rubber layer are desirably bonded together by an adhesive agent.

A sealing layer may be provided at least at an end portion of the inner surface of the inner tube of the hose. The sealing layer is formed of a chlorinated elastomer that contains a dispersion of an acid receptive agent. Preferably, the chlorinated elastomer contains the acid receptive agent in an amount within a range of 5-25% by weight, per 100% by weight of the elastomer.

The second object indicated above may be accomplished according to another aspect of the present invention, which provides a connector for a refrigerant transporting hose as described above, the connector having a nipple on which an end portion of the hose is fitted, and wherein the connector includes a sealing layer which is formed on an outer circumferential surface of the nipple and which is formed of a chlorinated elastomer which contains a dispersion of an acid receptive agent. In this case, too, the chlorinated elastomer preferably contains the acid receptive agent in an amount within a range of 5-25% by weight, per 100% by weight of said elastomer.

The applicants found that the connector having a sealing layer formed of a chlorinated elastomer such as chlorinated polyethylene or chlorosulphonated polyethylene exhibits improved fluid-tightness and resistance to heat and light exposure. However, the applicants also found that the resin layer of the hose tends to crack due to oxidation caused by chlorine left in the elastomer of the sealing layer, if the sealing layer serves for a long time. The applicant further recognized that the sealing layer formed of a non-chlorinated elastomer does not cause deterioration of the resin layer of the hose, but tends to have poor heat resistance and adhesion to the hose and is not practically used. In view of these drawbacks, the applicants made a further study to reduce the activity of chlorine of the chlorinated elastomer, and improve the property of the non-chlorinated elastomer, in an effort to improve the heat resistance and adhesion of the sealing layer. As a result of this further study, the applicants discovered that the inclusion of MgO, PbO or other acid receptive agent as dispersed in the chlorinated elastomer protects the resin layer of the hose against deterioration, such that the acid receptive agent traps chlorine in the elastomer, and produces a halogenated compound effective to prevent the deterioration of the resin layer.

The connector of the present invention utilizes the properties of the chlorinated elastomer to give the sealing layer excellent durability, adhesion to the hose and fluid-tightness or sealing effect, for thereby preventing leakage of the refrigerant from the connection between the connector and the hose and assuring sufficient connecting strength with respect to the hose. Further, the acid receptive agent contained in the chlorinated elastomer functions to trap chlorine left in the elastomer, which would otherwise deteriorate or destroy the resin layer of the inner tube of the hose due to contact with the resin layer. Thus, the present hose connector has improved durability and assures firm fluid-tight connection of the hose.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 3 is a transverse cross sectional view of a further embodiment of the hose of the invention;

FIG. 4 is a transverse cross sectional view of a still further embodiment of the hose of the invention;

FIG. 5 is a fragmentary cross sectional view of one embodiment of a connector of the present invention for a refrigerant transporting hose;

DETAILED DESCRIPTION OF THE PREFERRED EMBODIMENTS

Figure 1:
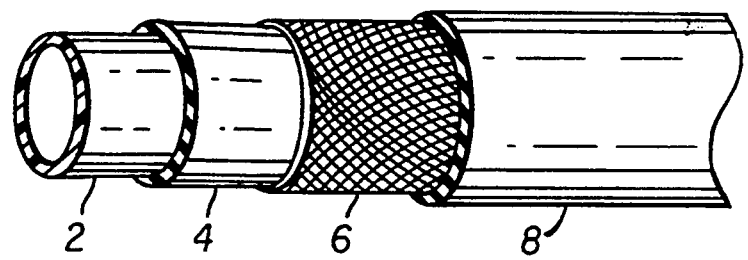
FIG. 1 is a perspective view showing a typical example of a refrigerant transporting hose embodying the present invention.

Referring first to FIG. 1, reference numeral 2 denotes a resin layer which is the innermost layer of a refrigerant transporting .hose according to one embodiment of the present invention. This resin layer 2 is formed of a resin composition consisting of three components, namely, modified polyolefin, polyamide resin, and ε-caprolactam. Radially outwardly adjacent to the resin layer 2, there is integrally formed an inner rubber layer 4 having a suitable thickness. The resin layer 2 and the inner rubber layer 4 constitute an inner tube of the hose. Radially outwardly of the inner rubber layer 4 of the inner tube 2, 4, there is formed a reinforcing fiber layer 6, on which is formed an outer rubber tube 8. Thus, the hose has an integral laminar structure consisting of the inner tube 2, 4, reinforcing fiber layer 6 and outer rubber tube 8, which are coaxial with each other.

As indicated above, the resin layer 2 (inner layer) of the inner tube of the hose consists of modified polyolefin, polyamide resin and ε-caprolactam whose proportion is suitably determined according to the principle of the present invention, so that the hose has considerably improved flexibility as compared with a known hose whose resin layer consists solely of polyamide resin, and exhibits sufficiently high impermeability with respect to a refrigerant. While the refrigerant impermeability of the resin layer 2 is more or less inferior to that of the known resin layer formed solely of polyamide resin, the excellent flexibility of the resin layer 2 makes it possible to increase the thickness of the resin layer 2 without deteriorating its flexibility, thereby giving the resin layer 2 to exhibit sufficient permeation resistance to the refrigerant, which is comparable to that of the polyamide resin layer. That is, the thickness of the resin layer 2 can be increased to an extent corresponding the inferiority of the resin layer 2 in the refrigerant impermeability to the known polyamide resin layer.

The modified polyolefin used for the resin composition of the resin layer 2 is obtained by modifying polyolefin such as a polymer of ethylene or propylene or a co-polymer thereof by graft polymerization of a monomer such as unsaturated carboxylic acid or a derivative thereof. The unsaturated carboxylic acid used as a component of the graft polymer may be unsaturated monocarboxylic acid such as acrylic acid and methacrylic acid, or unsaturated dicarboxylic acid such as maleic acid and fumaric acid. The derivative of the unsaturated carboxylic acid may be acid anhydride, amide, ester or acid halide. The content of the unsaturated carboxylic acid in the graft polymer is held within a range of 0.1–20 mole %.

The polyamide resin blended with the modified polyolefin may be nylon 6, nylon 66, nylon 12, nylon 612, nylon 6/66, or a combination of two or more of these nylon materials.

The blending proportion A/B by weight of the modified polyolefin (content A by weight) and the polyamide resin (content B by weight) is held within a range between 40/60 and 10/90, depending upon the desired balance between the flexibility and refrigerant impermeability of the resin layer 2. Preferably, the proportion A/B is held within a range between 30/70 and 20/80. If the content (A) of the modified polyolefin exceeds the content (B) of the polyamide resin, the hose will not exhibit a sufficient degree of refrigerant impermeability. On the other hand, the flexibility of the hose decreases as the content (A) of the modified polyolefin increases and the content (B) of the polyamide resin accordingly decreases.

The resin composition for the resin layer 2 which includes a blend of the modified polyolefin and polyamide resin in the proportion (A/B) specified above, contains 1–10% by weight, preferably 3–7% by weight of ε-caprolactam widely used as a monomer of nylon 6. This arrangement remarkably increases the flexibility of the resin layer 2 as a constituent layer of the inner tube 2, 4 of the hose, and accordingly, the overall flexibility of the hose as a whole. The resin composition should contain at least 1% by weight of ε-caprolactam, so that the inclusion of this component provides a significant effect on the increase in the flexibility of the hose. If the content of the ε-caprolactam exceeds 10% by weight, the refrigerant impermeability of the hose will be deteriorated, and the hose tends to suffer from a bloom of the ε-caprolactam exuding on its surface.

While the resin composition of the resin layer 2 constituting a layer of the inner tube of the hose consists of a suitable proportion of the modified polyolefin, polyamide resin and ε-caprolactam, the component ε-caprolactam exhibits high affinity to a non-polar rubber material, for example, a rubber material having no polar functional group, such as ethylene-propylene rubber (EPM), ethylene-propylene-diene rubber (EPDM), butyl rubber (IIR) and halogenated butyl rubber (Cl-IIR, Br-IIR, etc.). In this respect, the inner rubber layer 4 of the inner tube 2, 4 is desirably formed of such a non-polar rubber material as indicated above, for improving the adhesion between the innermost resin layer 2 and the inner rubber layer 4.

The resin layer 2 and the inner rubber layer 4 are bonded together by a suitable adhesive agent, to form the integral inner tube 2, 4. Preferably, a chlorinated rubber adhesive or phenolic adhesive is used as the adhesive agent for these layers 2, 4.

The reinforcing fiber layer 6 may be a fiber layer commonly used for ordinary rubber hoses. For instance, the fiber layer 6 is formed by braiding or spiral-knitting of yarn principally consisting of synthetic fiber such as polyester or aramid fiber. The outer rubber tube 8, which is the outermost layer of the hose, should exhibit high degrees of resistance to light and heat exposure, and resistance to water permeation. In this sense, the outer rubber tube 8 is desirably formed of a rubber material such as EPDM and Cl-IIR indicated above with respect to the inner rubber layer 4. It is needless to say, however, that other rubber materials may be used for the outer rubber tube 8.

Figure 2:
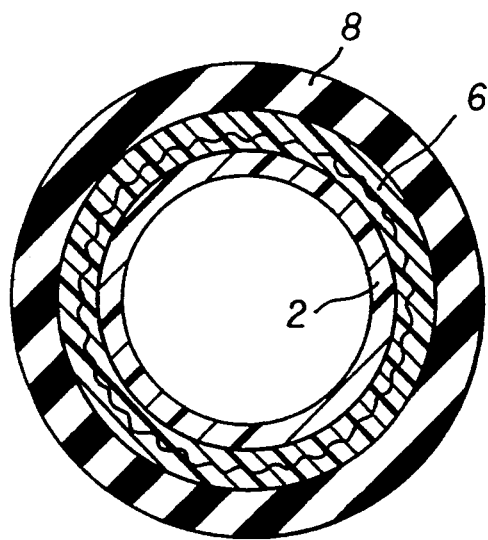
FIG. 2 is a transverse cross sectional view of another embodiment of the refrigerant transporting hose of the present invention.

While one example of the refrigerant transporting hose according to the present invention has been described above by reference to FIG. 1, the present invention may be otherwise embodied without departing from the spirit of the invention. For example, the inner tube of the hose may consist of a single layer, namely, consist solely of the resin layer 2 as shown in FIG. 2. In FIGS. 3 and 4, there are illustrated other embodiments of the hose of the present invention, wherein an innermost rubber layer 10 is provided inwardly adjacent to the resin layer 2 of the hoses of FIGS. 1 and 2, respectively. The innermost rubber layer 10, which serves as the innermost layer of the inner tube 2, 4, 10 (FIG. 3) or inner tube 2, 10 (FIG. 4), is formed of a rubber material having high elasticity, so as to assure a high sealing effect or fluid-tightness with respect to a nipple of hose connectors or coupling joints disposed at the opposite ends of the hose. The laminar structure of the hose according to the present invention may be suitably determined or selected to suit particular requirements or needs, depending upon the utility or application of the specific hose.

The thicknesses of the individual layers, i.e., resin layer 2, inner rubber layer 4 and innermost rubber layer 10 of the inner tube, and the outer rubber tube 8 are suitably determined depending upon the specific materials of the layers, and the desired diameter and wall thickness of the hose. For the hoses which are commonly used, the resin layer has a thickness of 0.05–0.5 mm, preferably in the neighborhood of 0.15 mm, while the inner rubber layer 4 has a thickness of 1.0–3.0 mm, preferably in the neighborhood of 2 mm. It will be understood that the thicknesses of the resin and inner rubber layers 2, 4 are suitably determined so as to provide a balance between the flexibility and the gas impermeability or permeation resistance. The outer rubber tube 8 which is the outermost layer of the hose generally has a thickness of 1–3 mm.

The refrigerant transporting hose according to the present invention may be fabricated by forming the individual constituent layers in the manner as described below, for example.

a) Initially, the inner tube (2, 4; 2; 2, 4, 10; or 2, 10) is formed on a rubbery or resin mandrel, by extrusion of the appropriate resin composition and/or rubber composition or compositions. Where the inner tube consists of the two or more layers as shown in FIGS. 1, 3 and 4, the individual layers are formed by sequential extruding operations or a concurrent extruding operation. In this extruding procedure, a selected adhesive agent is applied between the adjacent layers of the inner tube of the hose;

b) An adhesive (rubber cement) is applied to the outer surface of the inner tube (consisting of the resin layer 2, or two or more layers including the resin layer 2), as needed. Then, the reinforcing fiber layer 6 is formed by braiding or spiral-knitting of a selected reinforcing fiber yarn;

c) After an adhesive (e.g., rubber cement) is applied to the outer surface of the thus formed reinforcing fiber layer 6, the outer rubber tube 8 is formed by extrusion of the selected rubber composition; and d) The thus formed laminar tubular structure is vulcanized, and the mandrel is removed from the vulcanized hose structure. Thus, the desired hose can be fabricated. The vulcanization is generally effected at a temperature of 140°–170° C., for about 20–90 minutes.

The excellent characteristics and advantages of the hose according to the present invention will be understood from the following examples which were tested as described below:

Specimen Nos. 1–13 of the hose as shown in FIG. 1 were prepared as indicated in TABLE 1, by using the materials also indicated in the table. The constituent layers of the specimens were formed sequentially from the innermost layer to the outermost layer, by extrusion as described above. The obtained laminar tubular structures were heated and vulcanized, whereby the specimen hoses having an inside diameter of 11.0 mm were prepared. The proportions of the rubber compositions indicated in TABLE 1 are as follows:

for the adhesion between the resin layer 2 and the inner rubber layer 4. The results of the tests and observation are also indicated in TABLE 1. The tests and observation were conducted in the following manners:

Flexibility of Hose

Each specimen hose whose inside diameter is 11.0 mm was cut to 400 mm length, and the 400 mm long hose was fixed at its one end to a flat plate. The hose was bent so that the other end contacted the plate. The stress applied to the hose was measured. I t will be understood that the flexibility increases with a decrease in the measured stress.

Refrigerant Impermeability

Each specimen hose (inside diameter=11.0 mm) was

TABLE 1

| Specimen No. | | | PRESENT INVENTION | | | | | | | | COMPARATIVE | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Inner Tube | Resin layer 2 | Material | Modified polyolefiin*2/Nylon 6/ε-caprolactam | | | | | | | | | | | | — |
| | | Proportion (by weight) | 37/ 58/ 5 | 29/ 70/ 1 | 28/ 67/ 5 | 28/ 67/ 5 | 28/ 67/ 5 | 25/ 65/ 10 | 18/ 77/ 5 | 8/ 87/ 5 | 47/ 48/ 5 | 30/ 70/ 0 | 20/ 60/ 20 | 0/ 100/ 0 | — |
| | | Thickness (mm) | 0.15 | 0.15 | 0.15 | 0.15 | 0.15 | 0.15 | 0.15 | 0.15 | 0.15 | 0.15 | 0.15 | 0.15 | — |
| | Adhesive*1 | | YES | YES | YES | YES | NO | YES | YES | YES | YES | YES | YES | YES | — |
| | Inner Rubber layer 4 | Material | Cl-IIR | Cl-IIR | Cl-IIR | EPDM | Cl-IIR | Cl-IIR | Cl-IIR | Cl-IIR | Cl-IIR | Cl-IIR | Cl-IIR | Cl-IIR | NBR |
| | | Thickness (mm) | 2 | 2 | 2 | 2 | 2 | 2 | 2 | 2 | 2 | 2 | 2 | 2 | 2.15 |
| Reinforcing Fiber Layer 6 | | | Polyester fiber | | | | | | | | | | | | |
| Outer Rubber Tube 8 | | | EPDM (Thickness: 1.5 mm) | | | | | | | | | | | | |
| Refrigerant Impermeability (g/m/72 Hr) | | | 7 | 3 | 3 | 3 | 3 | 5 | 2 | 1 | 13 | 2 | 17 | 1 | 23 |
| Flexibility (kgf) | | | 0.9 | 1.2 | 1.0 | 1.1 | 1.0 | 0.8 | 1.2 | 1.4 | 0.7 | 1.6 | 0.6 | 2.3 | 0.9 |
| Adhesion between layers 2, 4 | | | ○ | ○ | ○ | ○ | ○ | ○ | ○ | ○ | ○ | x | ○ | x | — |

*1Chlorinated rubber adhesive, METALOC R26b available from TOYO KAGAKU KENKYUSHO CO. Ltd, Japan
*2Maleic anhidryde graft etylene-propylene rubber

| Components | Parts by weight |
|---|---|
| 1) Cl-IIR | |
| Polymer | 100 |
| FEF Carbon Black | 50 |
| Paraffin Process Oil | 20 |
| ZnO | 5 |
| Stearic Acid | 1 |
| Tetramethylthiuram disulfide | 1 |
| 2) EPDM | |
| Polymer ($C_3$ content = 35%) | 100 |
| FEF Carbon Black | 100 |
| Paraffin Process oil | 60 |
| ZnO | 5 |
| Stearic Acid | 1 |
| Sulfur | 1 |
| Tetramethylthiuram disulfide | 2 |
| N-cyclohexyl-2-benzothiazyl sulfenamide | 1 |
| 3) NBR | |
| Polymer (AN = 42%) | 100 |
| FEF Carbon Black | 60 |
| Dioctyl Phthalate | 10 |
| ZnO | 5 |
| Stearic Acid | 1 |
| Sulfur | 1 |
| Tetramethylthiuram disulfide | 2 |
| N-cyclohexyl-2-benzothiazyl sulfenamide | 1 |

The thus prepared specimens were tested for their flexibility and refrigerant impermeability, and observed cut to 500 mm length, and the 500 mm long hose was filled with 40g of Flon 134a in the liquid phase, with the opposite open ends fluid-tightly closed. The weight of the flon filled hose was measured, and compared with the initial weight to obtain an amount of loss of the flon liquid due to permeation through the hose wall. It will be understood that the impermeability or permeation resistance increases with a decrease in the amount of the flon loss.

Adhesion between Layers 2, 4

Each specimen hose (inside diameter=11.0 mm) was cut along a plane parallel to the center line of the hose, and the cut surfaces were observed for qualitative analysis on the separation of the resin and inner rubber layers 2, 4.

As is apparent from TABLE 1, the specimen Nos. 1–8 which has the resin layer 2 formed of the resin composition according to the present invention exhibited higher flexibility and refrigerant impermeability and better adhesion between the resin and inner rubber layers 2, 4, than the comparative specimen Nos. 9–13.

The comparative specimen No. 13 whose inner tube consists solely of a rubber material was found considerably poor in the refrigerant impermeability. Further, the comparative specimen Nos. 10 and 12 whose resin layer 2 does not contain ε-caprolactam in addition to the blend of modified polyolefin and polyamide resin were found poor in the flexibility. The comparative specimens also indicate that the refrigerant impermeability of the hose is deteriorated if the amount of the modified polyolefin with respect to that of the polyamide resin or the content of the ε-caprolactam exceeds the upper limit indicated above.

The refrigerant transporting hose of the present invention as described above may be advantageously used with a hose connector as shown in FIG. 5, which is also constructed according to the present invention. This connector has a nipple 12 whose outer circumferential surface has a plurality of grooves. The hose indicated generally at 14 is connected at one end portion thereof to the nipple 12 of the hose connector, such that the inner surface of the hose is fitted on the outer surface of the nipple 12. According to the present invention, a sealing layer 16 is provided on the outer surface of the nipple 12, to improve the fluid-tightness and connecting strength between the hose 14 and the nipple 12. The sealing layer 16 is formed of a chlorinated elastomer including a dispersion of an acid receptive agent, as discussed below in detail.

The acid receptive agent used for the chlorinated elastomer is used to trap halogen produced by the elastomer and thereby producing a halogenated compound, which functions to prevent deterioration of the resin layer of the hose. The acid receptive agent may be selected, for example, from among MgO, PbO, hydrotalcite, epoxy resin, and dibasic phthalic acid salt. Of these materials, a powder of MgO is preferably used. Where the MgO powder is used, it is desirable that the particle size of the power be in the neighborhood of 19 μm, for improved dispersion of the powder in the elastomer. The dispersion of the MgO powder may be further improved by coating the MgO particle surface with a surfactant such as fatty acid ester.

The chlorinated elastomer in which the acid receptive agent is dispersed is an elastomer chlorinated as a result of reaction of an elastomer with chlorine. The chlorinated elastomer may be chlorosulphonated polyethylene rubber or chlorinated polyethylene rubber, preferably, chlorosulphonated polyethylene rubber.

It is desirable that the content of the acid receptive agent be held within a range of 5-25% by weight with respect to the solid components of the elastomer. If the content of the acid receptive agent is smaller than the lower limit of 5% by weight, the halogen trapping effect of the acid receptive agent is not sufficient to assure complete prevention of the resin layer of the hose. If the content of the acid receptive agent exceeds the upper limit of 25%, the tackiness of the elastomer composition for the sealing layer 16 is lowered, leading to reduction in the sealing effect between the hose 14 and the nipple 12.

The sealing layer 16 of the hose connector may be formed in the following manner using the materials indicated above. Initially, a chlorinated elastomer is mixed with an acid receptive agent such as MgO and a solvent such as toluene, and evenly kneaded in a mixer, to obtain a fluidic elastomer liquid. The thus prepared elastomer liquid containing the acid receptive agent is applied to the outer circumferential surface of the nipple 12, so as to form the sealing layer 16 having a suitable thickness, as shown in FIG. 5. The end portion of the hose 14 whose inner tube includes the resin layer 2 is fitted on the nipple 12 covered by the sealing layer 16. If necessary, a socket is press-fitted on the end portion of the hose 14, to increase the surface pressure or connecting strength between the nipple 12 and the hose 14.

The hose connector thus constructed permits sufficient sealing between the hose 14 and the nipple 12, without deterioration of the resin layer 2 during a long period of use of the hose 14.

Figure 6:
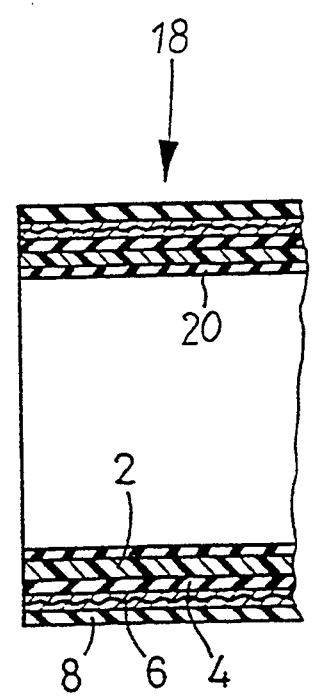
FIG. 6 is a fragmentary cross sectional view of a refrigerant transporting hose according to a further embodiment of the invention.

While the sealing layer 16 is provided on the outer surface of the nipple 12 of the hose connector, a sealing layer containing the acid receptive agent may be formed on the inner surface of the hose, more precisely, on the surface of the innermost layer of the inner tube, at least at the end or ends of the hose. FIG. 6 shows a hose 18 which has a sealing layer 20. In this case, too, the sealing layer 20 is interposed between the hose 18 and the nipple of the connector when the hose 18 is connected to the connector.

The advantage of the hose connector according to the present invention will be understood from the following test:

Six different elastomer liquids were prepared using the materials as indicated in TABLE 2, and applied to the outer circumferential surface of the nipple 12, to form

TABLE 2

| Specimen No. | | PRESENT INVENTION | | | | | COMPARATIVE |
|---|---|---|---|---|---|---|---|
| | | 1 | 2 | 3 | 4 | 5 | 6 |
| Composition | CSM | 100 | 100 | 100 | 100 | 100 | 100 |
| (parts by weight) | MgO | 10 | 17 | 25 | 30 | — | — |
| | PbO | — | — | — | — | 8 | — |
| | Toluene | 40 | 40 | 40 | 40 | 40 | 40 |
| Resin Durability | | o | o | o | o | o | x |
| Sealing Effect | | o | o | o | Δ | o | o |
| Connecting Strength | | o | o | o | Δ | o | o | the sealing layer 16 as shown in FIG. 5, whereby specimen Nos. 1–6 of the hose connector were obtained. The hoses 14 having a laminar tubular structure as shown in FIG. 1 were connected to the specimen connectors. The connectors and the end portion of the respective hoses were maintained at 120° C. for 168 hours. Then, the resin layer 2 of the hoses 14 was observed for deterioration, and the connections between the hoses 14 and the connectors were tested for sealing effect and connecting strength, as described below. The results of the observation and tests are indicated in TABLE 2.

Deterioration of Resin Layer 2

The inner circumferential surface of the resin layer 2 was visually inspected to check if the surface had cracks or not. In TABLE 2, "o" indicates the absence of the cracks, while "x" indicates the presence of the cracks.

Sealing Effect

The connectors and the end portion of the hoses 14 were immersed in water, and nitrogen gas having a pressure of 30 kg/cm$_2$ was blown into the hoses for five minutes. During the blowing of the nitrogen gas into the hoses, the connection was observed for leakage of the nitrogen gas, which resulted in the occurrence of bubbles in the water. In TABLE 2, "o", "Δ" and "x" indicate the absence of bubbling (nitrogen gas leakage), slight bubbling and considerable bubbling, respectively.

Connecting Strength

The connector was gripped by one hand, and the hose 14 gripped by the other hand was pulled, to check if the hose 14 was easily pulled off the connector. In TABLE 2, "o", "Δ" and "x" indicate that the hose 14 was not pulled off, was pulled off with a relatively large force, and was easily pulled off with a small force.

While the present invention has been described in its presently preferred embodiments, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. A hose-connector combination consisting of
a refrigerant transporting hose having an end portion and a laminar structure including an inner tube consisting of at least one layer, an outer tube disposed radially outwardly of and coaxially with the inner tube, and a reinforcing fiber layer interposed between the inner and outer tubes, said inner tube including a resin layer formed of a resin composition which consists essentially of a blend of modified polyolefin and polyamide resin, and 1–10% by weight of ε-caprolactam, the proportion by weight of said modified polyolefin to said polyamide resin being within a range between 40/60 and 10/90 and
a connector having a nipple on which the end portion of the hose is fitted, wherein the improvement comprises:
a sealing layer interposed between an outer circumferential surface of said nipple and an inner surface of said inner tube of said hose, said sealing layer formed of a chlorinated elastomer containing a dispersion of an acid receptive agent.

2. A hose connector combination according to claim 1, wherein said chlorinated elastomer contains said acid receptive agent in an amount within a range of 5–25% by weight, per 100% by weight of said elastomer.

3. A hose connector combination according to claim 1, wherein said acid receptive agent is selected from the group consisting of MgO, PbO, hydrotalcite, epoxy resin, and dibasic phthalic acid salt.

* * * * *